United States Patent [19]
Kälber et al.

[11] Patent Number: 5,675,898
[45] Date of Patent: Oct. 14, 1997

[54] ANTI-SPLINTERING DEVICE FOR SAWING MACHINES HAVING A SAW BLADE

[76] Inventors: Gerhard Kälber; Ralf Kälber, both of Zaisersweiher Str. 17/1, D-75417 Mühlacker, Germany

[21] Appl. No.: 256,481

[22] PCT Filed: Jan. 13, 1993

[86] PCT No.: PCT/DE93/00014

§ 371 Date: Jul. 8, 1994

§ 102(e) Date: Jul. 8, 1994

[87] PCT Pub. No.: WO93/13919

PCT Pub. Date: Jul. 22, 1993

[30] Foreign Application Priority Data

Jan. 14, 1992 [DE] Germany .................. 42 00 713.5
Mar. 17, 1992 [DE] Germany .................. 9203580 U

[51] Int. Cl.[6] ..................................... B27G 19/10
[52] U.S. Cl. ..................................... 30/374
[58] Field of Search ..................... 30/371, 373, 374, 30/376, 286, 289; 83/821, 823, 828, 829

[56] References Cited

U.S. PATENT DOCUMENTS

| | | | |
|---|---|---|---|
| 2,842,170 | 7/1958 | Bruck et al. | 30/374 |
| 2,854,043 | 9/1958 | Raymond | 30/376 |
| 2,996,089 | 8/1961 | McCarty | 30/374 |
| 3,623,518 | 11/1971 | Nicotra | 30/374 |

FOREIGN PATENT DOCUMENTS

| | | |
|---|---|---|
| 0163186 | 12/1985 | European Pat. Off. . |
| 0259716 | 3/1988 | European Pat. Off. . |
| 8314647 | 10/1983 | Germany . |
| 3718232 | 10/1991 | Germany . |
| 9106212 | 1/1992 | Germany . |
| 380356 | 9/1964 | Switzerland . |
| 83/02917 | 9/1983 | WIPO . |
| 93/13920 | 7/1993 | WIPO . |

*Primary Examiner*—Hwei-Siu Payer

[57] ABSTRACT

The invention relates to an anti-splintering device for sawing machines having a saw blade which can be operationally connected to a saw blade, can be laid on workpieces and can be arranged laterally in relation to the saw blade and in the region of the saw blade teeth emerging from the workpiece. The anti-splintering device is in pressure contact with the emerging saw blade teeth.

11 Claims, 9 Drawing Sheets

ANTI-SPLINTERING DEVICE FOR SAWING MACHINES HAVING A SAW BLADE

BACKGROUND OF THE INVENTION

The invention relates to an anti-splintering device for sawing machines having a saw blade which can be operationally connected to the sawing machine, can be laid on workpieces and can be arranged laterally in relation to the saw blade and in the region of the saw blade teeth emerging from the workpiece.

An anti-splintering device of the type referred to initially is known and is described, for example, in DE 37 18 232 C2 as a guard plate of a circular saw. The circular saw consists of a sawing table and a motor-driven saw blade, the sawing table having a recess for the passage of the saw blade to reach a workpiece which is to be sawn, and the splinter guard plate, which can be releasably attached to the sawing table, being assigned to the recess, resting on the workpiece during use and masking the recess on both sides of the saw blade. The splinter guard plate consists in this case of hard rubber, plastic or a similar sawable, non-splintering material, being of continuous design in the new state and acquiring a saw slit as a result of the first pivoting movement of the saw blade. It is perceived to be a disadvantage of the known splinter guard plate that it can only fulfil this function lastingly under certain preconditions, specifically if the saw blade does not wobble or wobbles very little, which is only theoretically possible, and if the same or an identical saw blade is always used. If the original saw blade is replaced by another whose dimensions differ from the dimensions of the original saw blade, then the slit which was originally regarded as optimum changes, which is undesirable. It is to be regarded as a further disadvantage of the known splinter guard plate that it is hardly suited to minimising the amplitudes of the vibrations of the saw blade, since no force is exerted on the saw blade. Finally, in DE-GM 83 14 647, a baseplate for hand-operated circular saws is described which has a recess for the floating protective cap and the saw blade. An anti-splintering device is inserted in the front region of the recess, relative to the saw blade, and is provided with a slit, exactly adapted to the tooth width of the saw blade, for the passage of the saw blade into this region. The anti-splintering device can be connected in a stationary manner to the baseplate, being able to fulfil its function only, at best, when the width of its slit corresponds to the width of the teeth. Since the saw blade performs vibrations, the width of the slit becomes greater over time, so that a gap forms between the saw blade and the anti-splintering device, the result of which is that a clean cut with a sharp edge can no longer be achieved.

SUMMARY OF THE INVENTION

On the basis of the above state of the art, the object of the invention is to provide an anti-splintering device which not only makes it possible to obtain a clean cut edge but is also suited to dampening vibrations of the saw blade.

The object set is achieved according to the invention, in the anti-splintering device of the generic type, in that the anti-splintering device is in pressure contact with the saw blade in the region of the emerging saw blade teeth.

It will be recognised that the invention is embodied whenever the anti-splintering device is a member which, in the operating state of the hand-operated circular saw, is actively connected simultaneously both to the workpiece and to the emerging teeth of the saw blade, so that the anti-splintering device exerts a force not only on the workpiece but also on the saw blade. This exertion of force prevents the formation of a gap between the teeth of the saw blade and the anti-splintering device. Since the anti-splintering device rests in close contact on the workpiece in the region of the cut, no gap, which could be regarded as the cause of a ragged cut edge, is formed in this region either. The cutting line also becomes considerably more precise as a result of the suppression or even elimination of vibrations of the saw blade.

It is particularly advantageous if the anti-splintering device is pressed resiliently against both sides of the saw blade. It thus follows every sideways movement of the saw blade. Further expedient and advantageous embodiments of the invention are evident from the subclaims.

If the proposed anti-splintering device is used in sawing machines with a sawing table, it is expedient if the part of the anti-splintering device resting on the workpiece lies in the contact plane defined by the workpiece and the sawing table or projects from the sawing table towards the workpiece. The alternative proposal is particularly suitable when the sawing machine is used to cut uneven workpieces.

Another expedient embodiment envisages that the anti-splintering device is adjustable relative to the saw blade, and can thus be set. This measure, according to the invention, can be used to particular advantage if the hand-operated circular saw is designed as an immersion saw, whose depth of immersion is altered as required. The radial adjustment of the anti-splintering device ensures that the anti-splintering device is always in pressure contact at least with the teeth of the saw blade. A further expedient embodiment of the invention envisages that the anti-splintering device can be connected to the sawing machine in an articulated manner and pivoted about the axis of the saw blade or about an axis extending parallel to that axis. This measure ensures that the anti-splintering device can be operatively connected to the teeth of the saw blade even when the depth of the immersion of the saw blade changes during the cutting operation. It is further envisaged that the anti-splintering device interacts with at least one spring element, by means of which the pressure of the anti-splintering device acting on the saw blade can be determined. This measure principally takes account of the fact that saw blades of different dimensions can be used in a sawing machine.

Another particularly expedient embodiment envisages that the anti-splintering device has a contacting element which is in pressure contact with the body of the saw blade and supports the part which is in pressure contact with the teeth of the saw blade and is designed as an anti-splintering member. These measures considerably reduce the wear on the part which is in pressure contact with the teeth of the saw blade, since the contacting element transmits to the saw blade the actual pressure originating from the anti-splintering device, whereas the anti-splintering member, which is actively connected to the teeth of the saw blade, exerts minimal pressure on the saw blade. The contacting element, which preferably consists of bearing material, simultaneously serves as a vibration damper for the saw blade, so that two advantages are achieved by simple measures: first, the wear on the anti-splintering device is considerably reduced, and secondly the anti-splintering member can consist of a considerably softer material than the contacting element.

A further particularly expedient embodiment of the invention envisages that the anti-splintering device can be accommodated in a housing which is detachably connectable to the sawing machine, so that it can readily be replaced if the individual parts of the anti-splintering device are worn.

Finally, the invention also relates to a sawing machine which can be fitted with an anti-splintering device described above.

BRIEF DESCRIPTION OF THE DRAWINGS

A number of illustrative embodiments of the invention are shown diagrammatically in the drawing and are explained in detail below. In the drawing.

DESCRIPTION OF THE PREFERRED EMBODIMENTS

Figure 1:
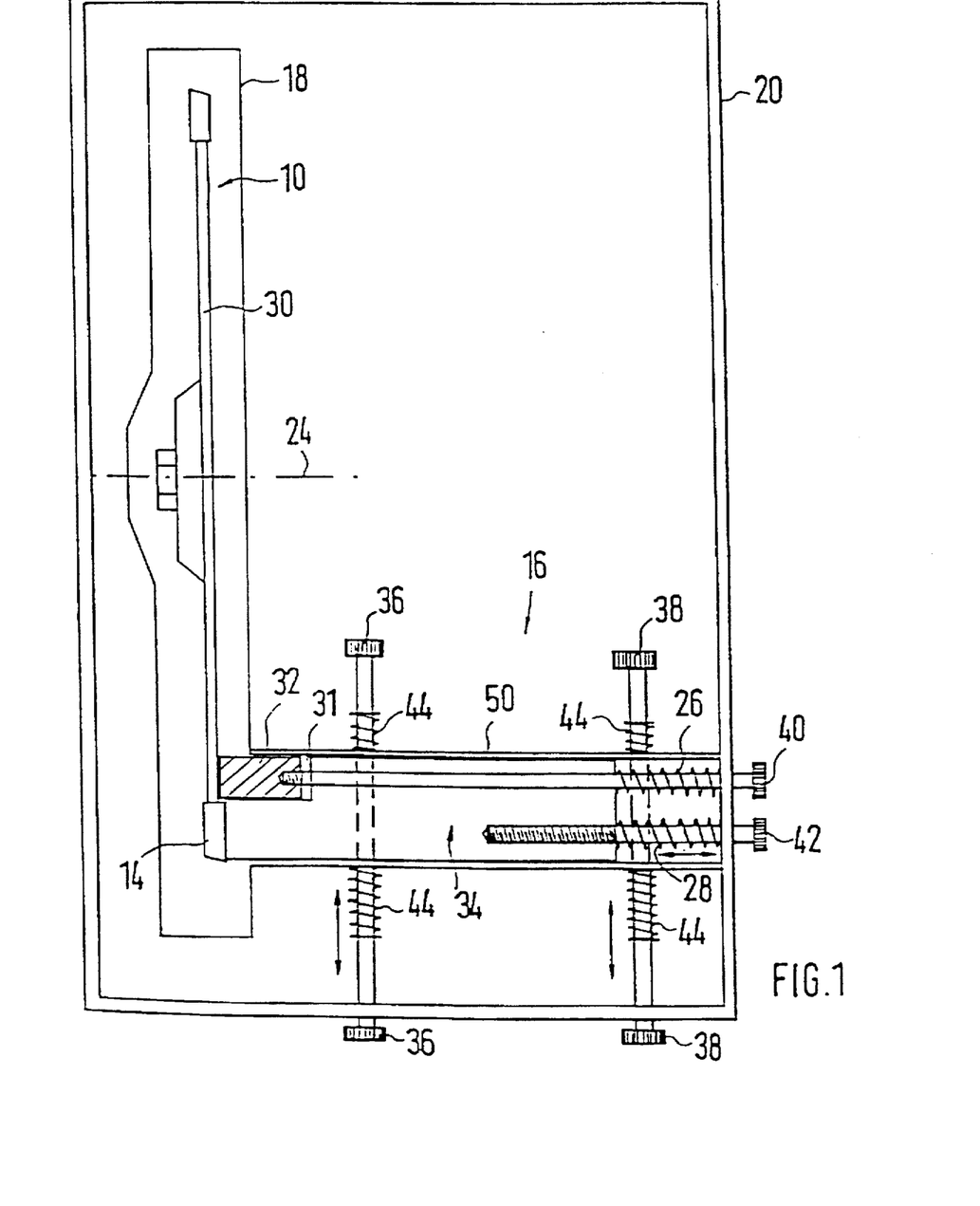
FIG. 1 shows part of a sawing machine in vertical plan view with an anti-splintering device.

FIG. 1 shows part of a sawing machine with a saw blade 10 and anti-splintering device 16. The anti-splintering device 16 can be operationally connected to the sawing machine, can be rested on a workpiece (not shown) and can be arranged laterally in relation to the saw blade 10 and in the region of the teeth 14 of the saw blade emerging from the workpiece. Formed in the sawing table 20 of the sawing machine is a saw-blade passage 18 in which the saw blade 10 is mounted to rotate about the axis 24. The anti-splintering device 16 is so designed that it is in pressure contact with the emerging teeth 14 of the saw blade. The anti-splintering device 16 is, moreover, so designed that its part 34, which can be rested on the workpiece, lies in the contact plane defined by the workpiece and the sawing table 20 or projects from the sawing table 20 towards the workpiece. The anti-splintering device 16 is accommodated in the housing 50, whose radial position can be determined by the screws 36 and 38. Since there is no rigid connection between the set-screws 36, 38 and the housing 50, spring elements 44 are provided which exert pressure on the housing 50.

Figure 2:
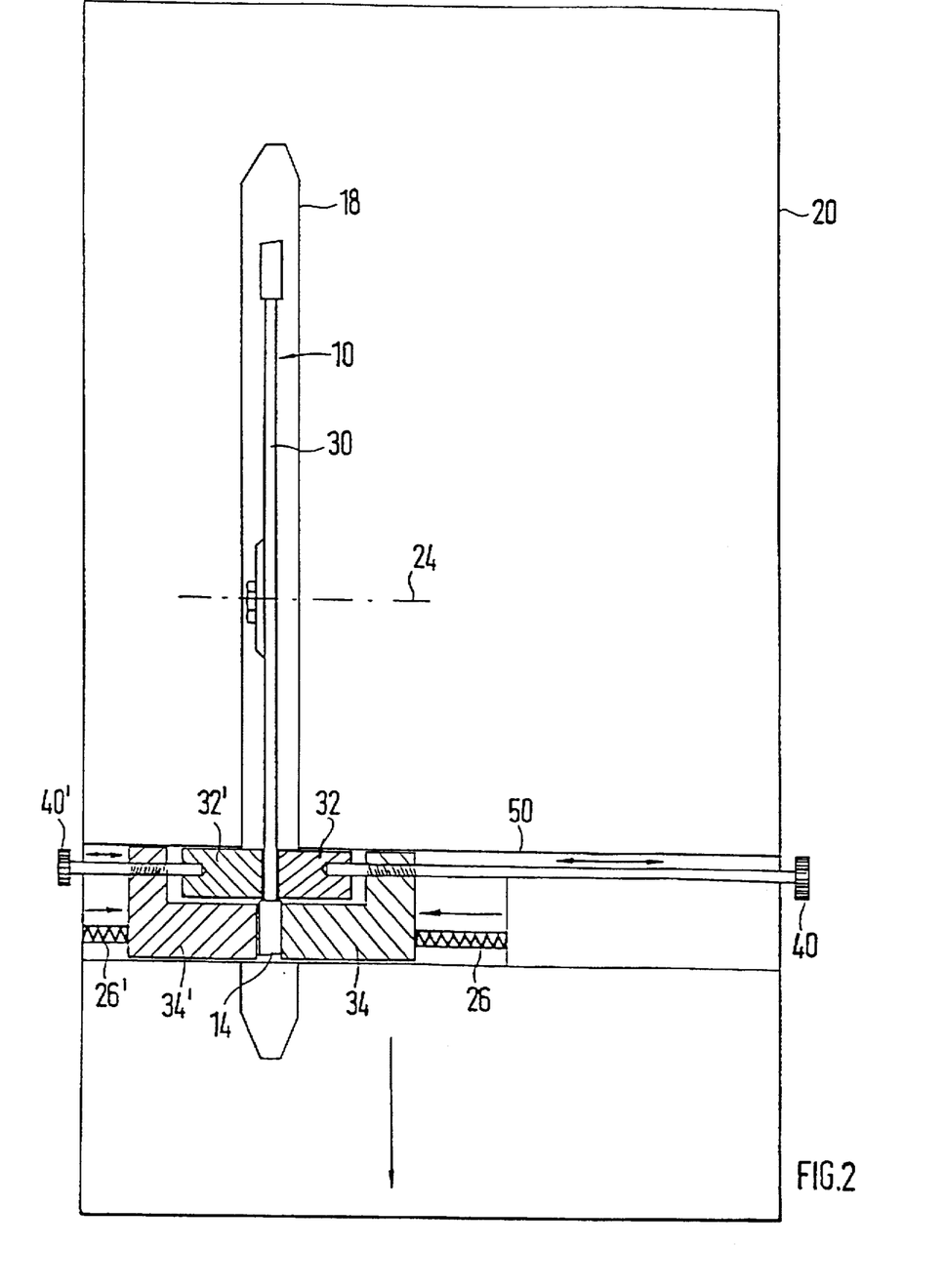
FIG. 2 shows a sawing machine with a further anti-splintering device.

The anti-splintering device 16 further possesses a contacting element 32, which is in pressure contact with the body 30 of the saw blade, and the part 34 which is in pressure contact with the teeth 14 of the saw blade and is designed as an anti-splintering member. It will be recognised that the contacting element 32 and the anti-splintering member 34 are adjustable in the axial direction of the saw blade 10 and thus can be set. The anti-splintering member 34 is adjustable relative to the contacting element 32, the contacting element 32 being designed as a dog of the anti-splintering member 34. In the initial position, that is to say before the anti-splintering device becomes operational, a gap 31 is formed between the contacting element 32 and the anti-splintering member 34. If the sawing machine is now switched on, the teeth 14 of the saw blade are actively connected to the anti-splintering member 34, which consists of cuttable material, so that the gap 31 is minimised. In this region, the anti-splintering member 34 is supported on the contacting element 32. Further wear on the anti-splintering member 34 arises in practice when wear is caused to the contacting element 32, which is in pressure contact with the level section of the body 30. Although both the contacting 32 and the anti-splintering member 34 are each in pressure contact with one spring element, 26 and 28 respectively, the spring element 28 can only press the anti-splintering member 34 against the contacting element 32. The contacting element 32 and the anti-splintering member 34 can additionally be regulated by set-screws 40 and 42, this regulation taking place towards the axis 24. FIG. 2 shows that the two sides of the saw blade 10 each interact with one anti-splintering device. In this arrangement, the individual parts of the anti-splintering device are of approximately mirror-image design. The contacting element 32', the anti-splintering member 34' and the spring element 26' approximately correspond to the corresponding parts of the other anti-splintering device.

Figure 3:
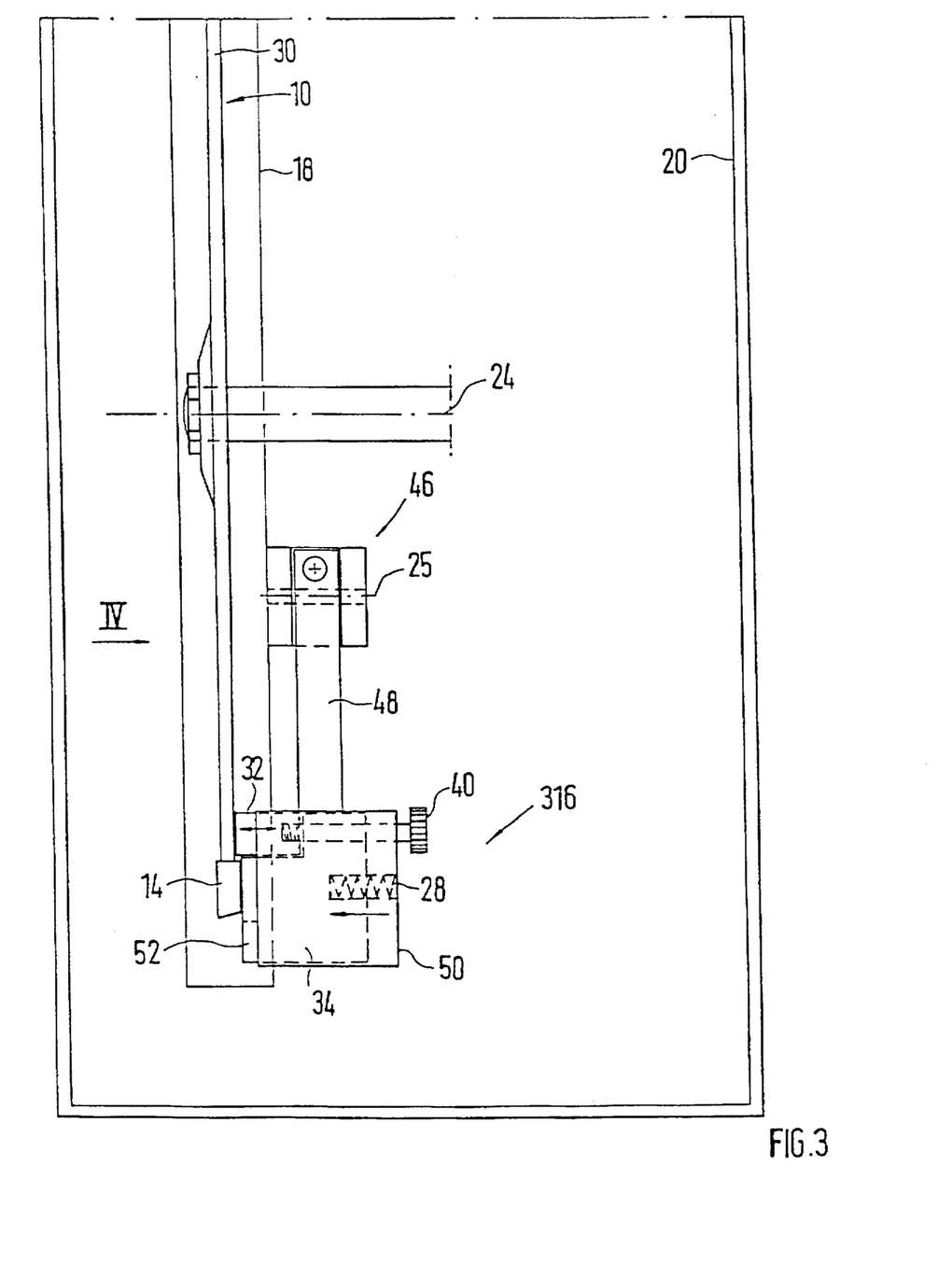
FIG. 3 shows a sawing machine whose anti-splintering device is pivotably mounted.
Figure 4:
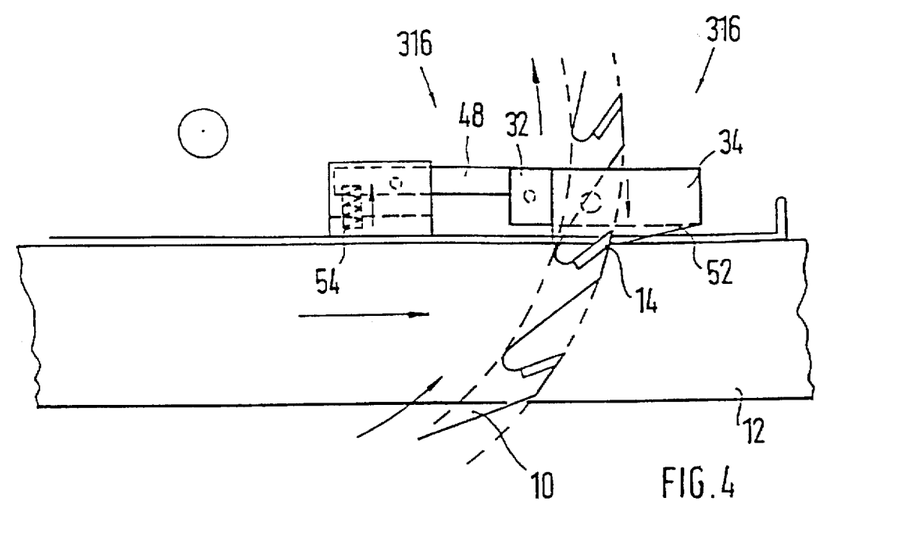
FIG. 4 shows the sawing machine shown in FIG. 3 in the direction of the arrow IV, during the cutting operation.
Figure 5:
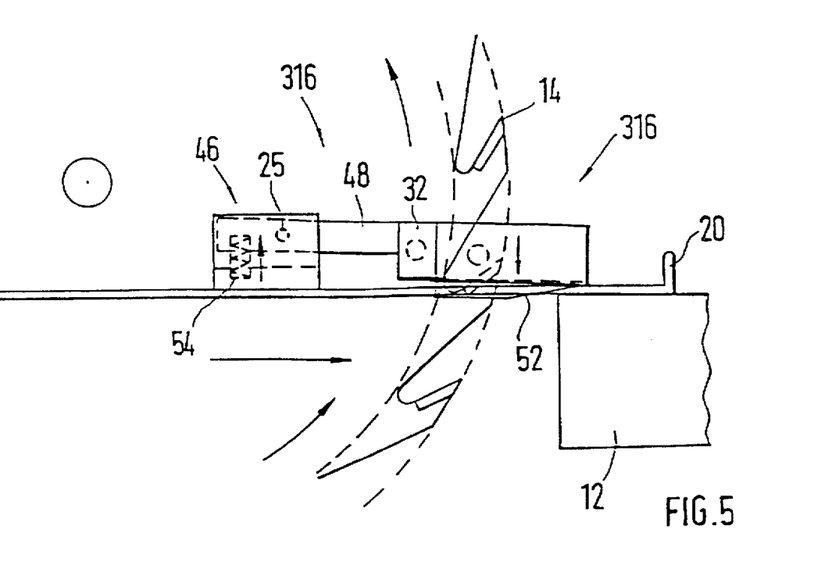
FIG. 5 shows the sawing machine shown in FIG. 4 before the cutting operation.

FIGS. 3 to 5 show an anti-splintering device 316 which can be pivoted, via a joint rod 48 and a joint 46, about an axis 25. The axis 25 extends parallel to the axis 24 of the saw blade 10. Thus, the anti-splintering device 316 can be pivoted in the direction of rotation of the saw blade 10. The contacting element 32 and the anti-splintering member 34 are accommodated in a housing 50. As is particularly apparent from FIGS. 4 and 5, the anti-splintering member 34 is further advanced and has an oblique stop surface 52. The joint arm 48 interacts with a compression spring 54, which tends to press the anti-splintering device 316 against the workpiece.

Figure 6:
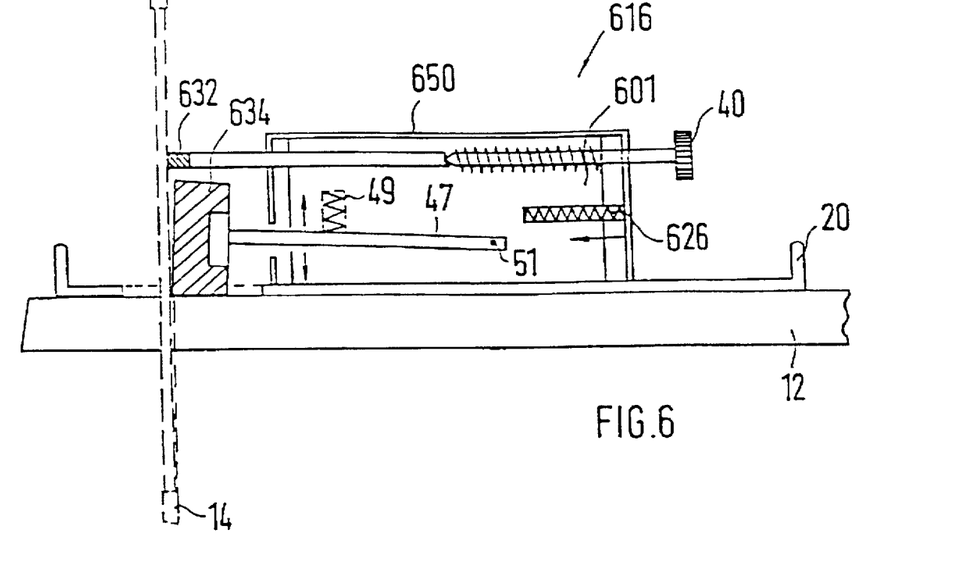
FIG. 6 shows a sawing machine having an anti-splintering device, whose anti-splintering member is pivotably mounted.
Figure 7:
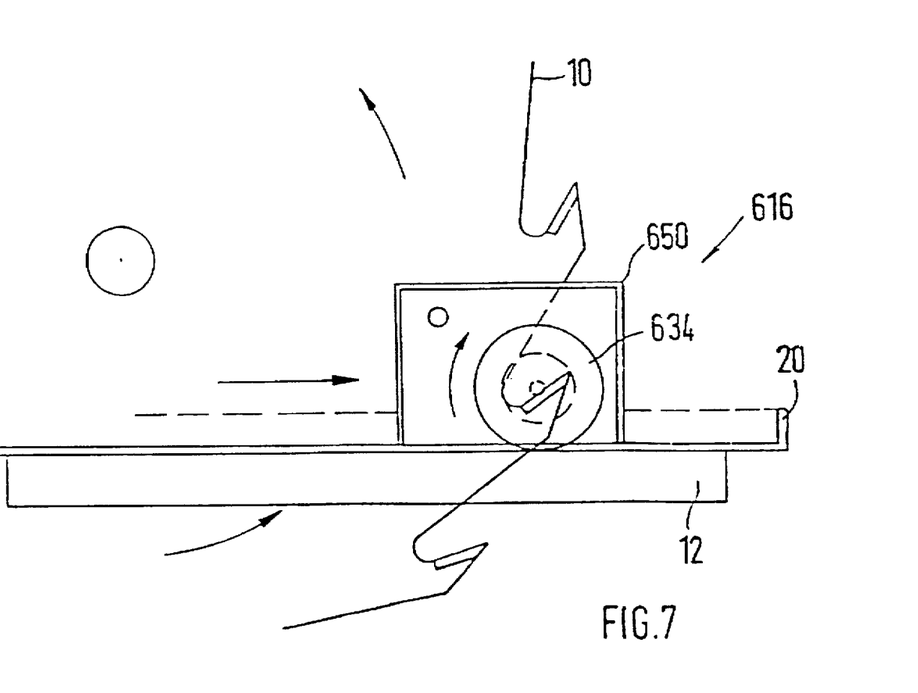
FIG. 7 shows a lateral view of the sawing machine shown in FIG. 6.

FIGS. 6 and 7 show a hand-operated circular saw with an anti-splintering device 616 which is accommodated in a housing 650 and has a contacting element 632 and an anti-splintering member 634. Accommodated in the housing 650 is a body 601 which is in pressure contact with the spring element 626 and bears both the sensor 632 and the anti-splintering member 634. The contacting element 632 can be set by the set-screw 40, while the anti-splintering member 634 rotatable in an articulated manner to the body 601 and pivoted about the axis 51. The anti-splintering member 634 is rotatable about the longitudinal axis of the joint arm 47 and pivotable in the direction of the arrows. The joint arm 47 interacts with a spring element 49, which tends to press the anti-splintering member 634 against the workpiece 12.

Figure 8:
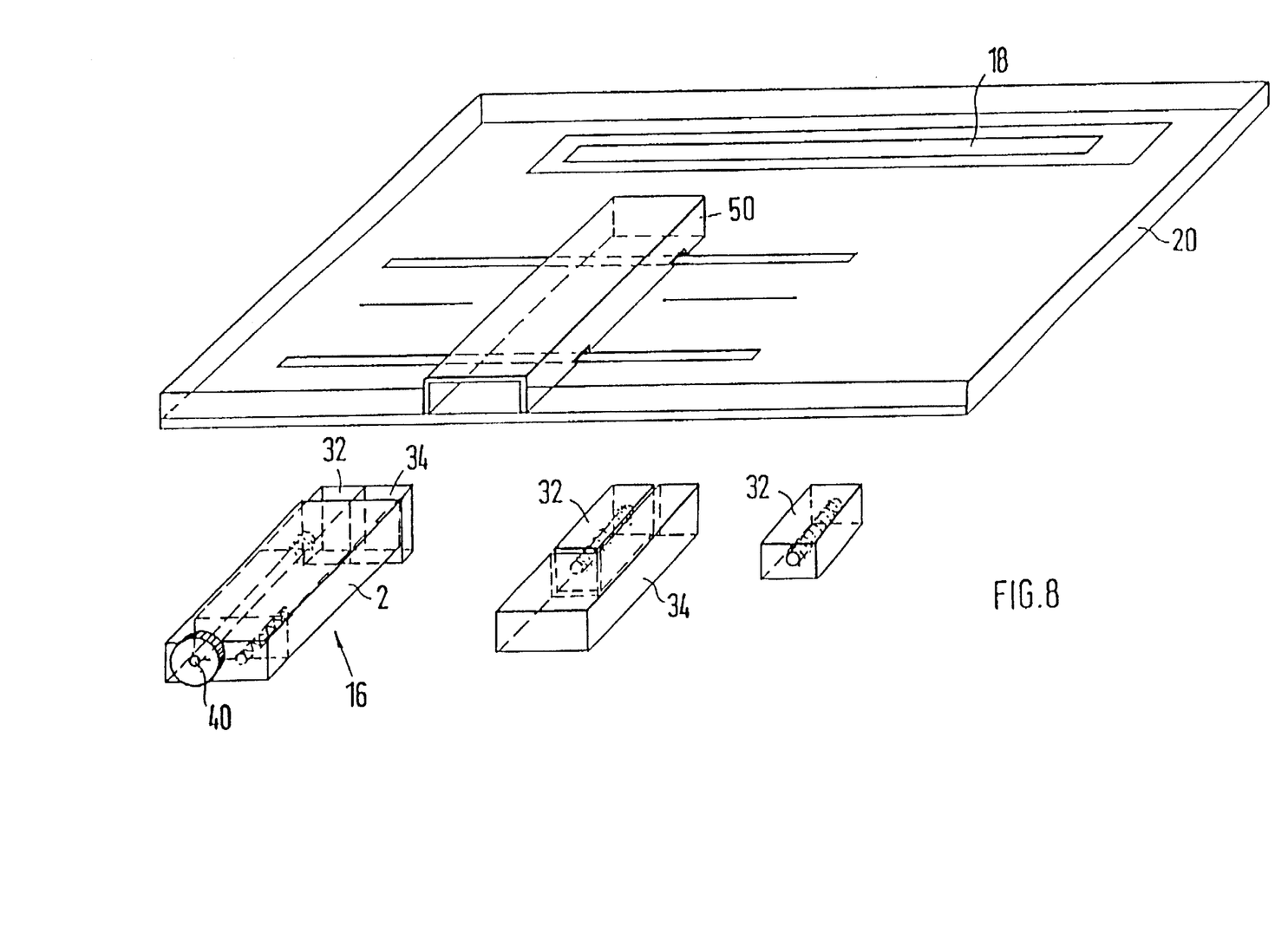
FIG. 8 shows a sawing table with parts of the anti-splintering device.

FIG. 8 shows a sawing table 20 with a saw-blade passage 18 and a housing 50. The anti-splintering device 16, with contacting element 32 and anti-splintering member 34, can be introduced into the housing 50. These two parts are, furthermore, accommodated in a further housing 2, so that the insertion of the anti-splintering device 16 into the housing 50 and/or its removal therefrom can take place without difficulty.

Figure 9:
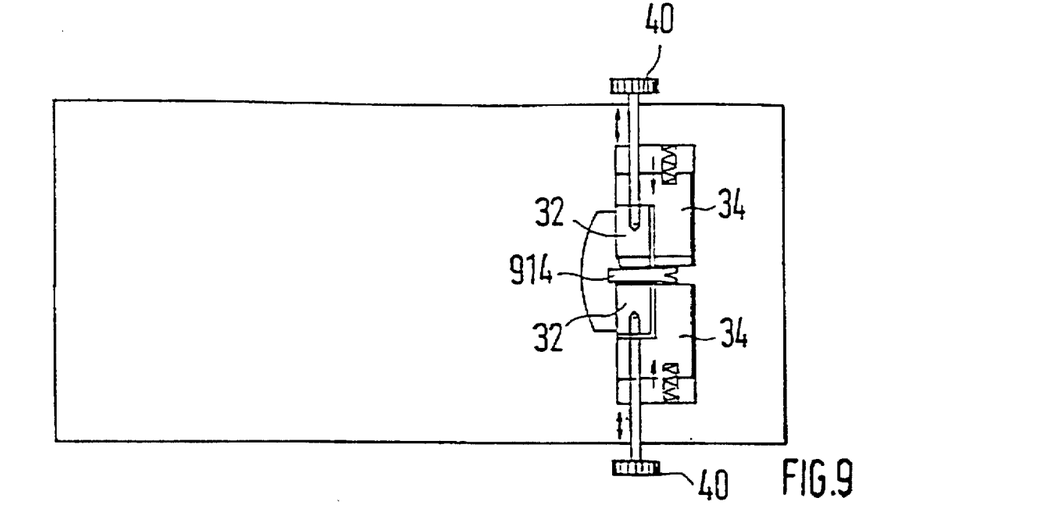
FIG. 9 shows a keyhole saw with anti-splintering device in vertical plan view.
Figure 10:
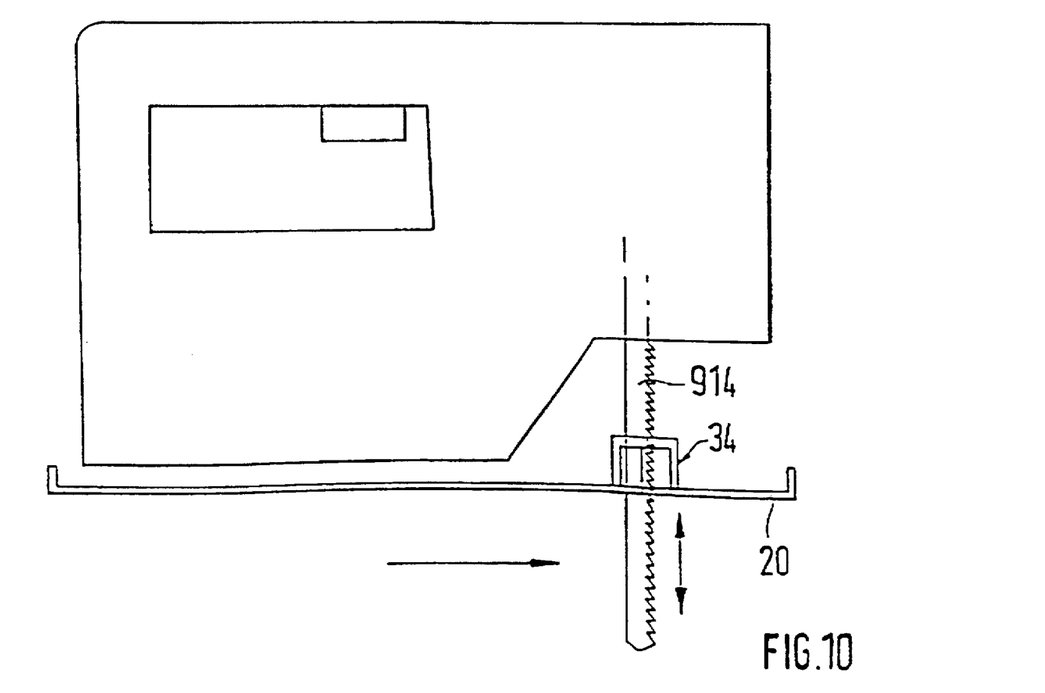
FIG. 10 shows the keyhole saw shown in FIG. 9 in a lateral view.

FIGS. 9 and 10 show that the anti-splintering device can also be used with a keyhole saw, the saw blade 914 performing vertical reciprocal movements.

Figures 11, 12:
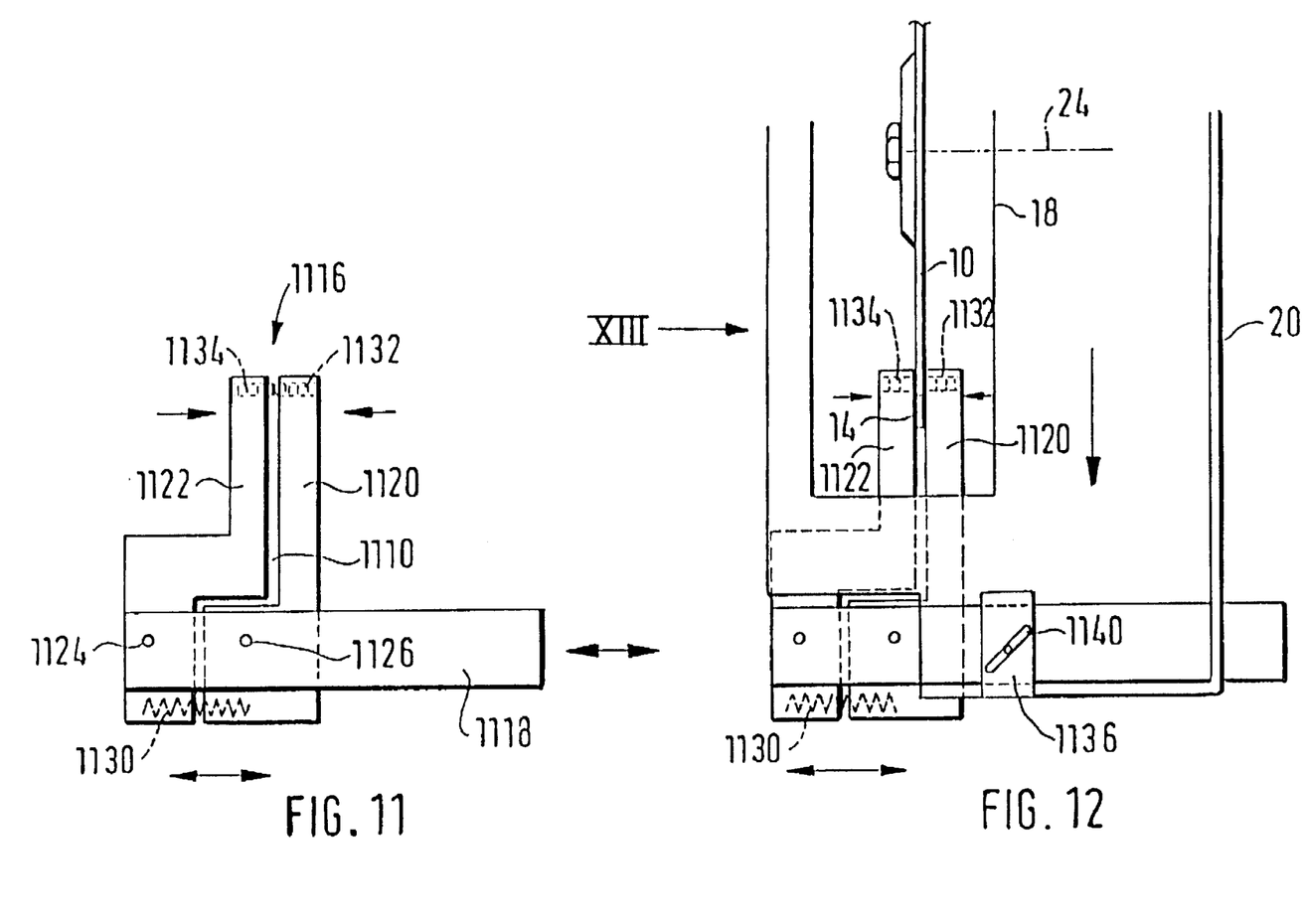
FIG. 11 shows an anti-splintering device designed as a separate part.
FIG. 12 shows the anti-splintering device shown in FIG. 11 in operational connection with a hand-operated circular saw.
Figure 13:
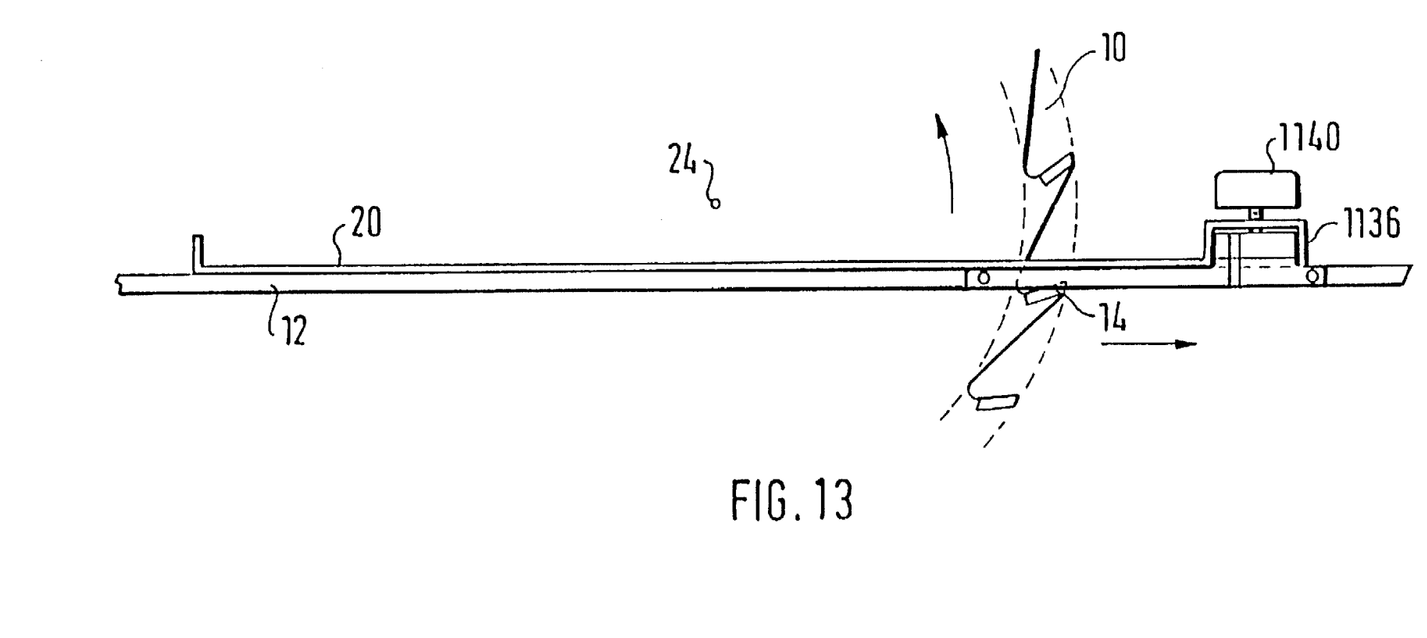
FIG. 13 shows the hand-operated circular saw shown in FIG. 12 in the direction of the arrow XII.

FIGS. 11 to 13 show an anti-splintering device 1116, which is intended as an accessory for hand-operated circular saws and keyhole saws and is hence designed as a separate part. This anti-splintering device 1116 consists of a plug part 1118 with two anti-splintering members 1120 and 1122 which can be positioned laterally in relation to the saw blade 10 and consist of cuttable material, that is to say a material whose hardness is less than that of the teeth of the sawing machine. The anti-splintering members 1120 and 1122 possess, in the region of contact with the saw blade 10, contacting elements 1132 and 1134 whose hardness is greater than the hardness of the anti-splintering members 1120 and 1122 and which preferably consist of bearing material.

A further feature of the anti-splintering members 1120 and 1122 is that they are articulated on the plug part 1118, this occurring in the regions 1124 and 1126. The ends of the anti-splintering members 1120, 1122 which are remote from the sensors 1132, 1134 interact with a compression spring 1130, which tends to press the contacting elements 1132, 1134 against the saw blade 10. The special feature of this articulation resides, in particular, in the fact that, as a result of the gap 1110 which is formed between the anti-splintering members 1120, 1122, the two anti-splintering members can be brought independently of each other into pressure contact with the saw blade 10. They are thus, as it were, in floating pressure contact with the saw blade 10 and can therefore follow lateral movements of the saw blade. The sawing machine possesses a plug socket 1136 with a tensioning screw 1140, which serves to fix the plug part 1118. A further special feature of the anti-splintering device 1116 resides in the fact that it can also preferably be actively connected to guide rails for sawing machines, since its thickness approximately corresponds to the thickness of the guide rails, so that the anti-splintering device 1116 can rest in close contact on the workpiece without a gap forming between the saw tooth 14 and the anti-splintering member 1120, 1122, which gap would critically contribute to the formation of splinters in the region of upper edges of the workpiece.

In summary, it may be stated that the proposed anti-splintering device or the deflection guard system can be employed with hand-operated circular saw, keyhole saws, stationary saws or even industrial saws. The production costs of the anti-splintering device are minimal, since it can be assembled from separate components, which are then operationally connected to a hand-operated circular saw. The splintering of the material is prevented directly at the saw tooth, so that no parallel guidance of the sawing table is required. The complete deflection guard with contacting element or sensor is resiliently guided on the saw blade so that no gap is formed between the saw teeth and the deflection guard. The sensor can, however, also be retrospectively adjusted as required.

A further advantage of the proposed anti-splintering device resides in the fact that it can also be attached underneath the sawing table. As a result, splintering is prevented even if there are irregularities of the workpiece surface. In this arrangement, it is advantageous to attach the anti-splintering device resiliently to the sawing machine. The contacting element and anti-splintering member are mouldings which can easily be replaced and are economical to produce.

The contacting element 32 is preferably made of a bearing material such as bronze, sintered metal or carbon. The sintered metal can also be oil-impregnated. A carbon sensor would have the additional advantage that it slowly wears and thus also adjusts the anti-splintering member 34 accordingly. The anti-splintering member 34 itself preferably consists of plastic.

We claim:

1. An anti-splintering device for mounting to a sawing machine having a saw blade, the device comprising a first region supported with an adjustable force on at least one side of the saw blade outside a region of saw blade teeth; and a second region adapted to be laid on a workpiece and arranged with a minimum clearance and substantially without a supporting force relative to the saw blade on the at least one side of the saw blade teeth, said second region being composed of a material which is cuttable by the saw blade teeth and carried by said first region; at least two parts including one part which forms said first region in the form of a contacting element, and another part which forms said second region in the form of an anti-splintering member, said anti-splintering member being adjustable relative to said contacting element, said contacting element being formed as a dog for said anti-splintering member; and means for adjusting said anti-splintering member relative to said contacting element.

2. An anti-splintering device as defined in claim 1, wherein said anti-splintering member is composed of a material with a hardness which is lower than a hardness of said contacting element.

3. An anti-splintering device for a sawing machine having a saw blade, the device comprising a first region supported with an adjustable force on at least one side of the saw blade outside a region of saw blade teeth; a second region adapted to be laid on a workpiece and arranged with a minimum clearance and substantially without a supporting force relative to the saw blade on the at least one side of the saw blade teeth, said second region being composed of a material which is cuttable by the saw blade teeth; and means for connecting said regions to the sawing machine in an articulated manner.

4. An anti-splintering device as defined in claim 3, wherein said connecting means is formed so that said regions are pivotable about an axis of the saw blade.

5. An anti-splintering device as defined in claim 3, wherein said connecting means is formed so that said regions are pivotable about an axis extending parallel to an axis of the saw blade.

6. An anti-splintering device for a sawing machine having a saw blade, the device comprising a first region supported with an adjustable force on at least one side of the saw blade outside a region of saw blade teeth; a second region adapted to be laid on a workpiece and arranged with a minimum clearance and substantially without a supporting force relative to the saw blade on the at least one side of the saw blade teeth, said second region being composed of a material which is cuttable by the saw blade teeth; and a housing accommodating said regions and provided with means for releasably connecting said housing to the sawing machine.

7. An anti-splintering device for a sawing machine having a saw blade, the device comprising a first region supported with an adjustable force on at least one side of the saw blade outside a region of saw blade teeth; a second region adapted to be laid on a workpiece and arranged with a minimum clearance and substantially without a supporting force relative to the saw blade on the at least one side of the saw blade teeth, said second region being composed of a material which is cuttable by the saw blade teeth; and a plug part which forms one of said regions and is detachably connectable to the sawing machine, and two anti-splintering members which form the other of said regions and are arranged laterally relative to the saw blade in pressure contact with the saw blade.

8. An anti-splintering device as defined in claim 7, wherein said anti-splintering members are articulated on said plug part.

9. An anti-splintering device as defined in claim 7; and further comprising at least one spring element which interacts with said anti-splintering members and tends to bring said anti-splintering members into pressure contact with the saw blade.

10. An anti-splintering device as defined in claim 7, wherein said anti-splintering members are provided with contacting elements in a region of contact with the saw blade.

11. An anti-splintering device as defined in claim 7, wherein said anti-splintering members are formed as parts which are offset in steps and composed of a cuttable material.

* * * * *